United States Patent
Kristen et al.

(10) Patent No.: US 6,180,737 B1
(45) Date of Patent: Jan. 30, 2001

(54) PROCESS FOR PREPARING POLYMERS OF $C_2$-$C_{10}$ ALKENES IN THE PRESENCE OF METALLOCENE COMPLEXES WITH CATIONICALLY FUNCTIONALIZED CYCLOPENTADIENYL LIGANDS

(75) Inventors: Marc Oliver Kristen, Limburgerhof; Peter Jutzi; Thomas Redeker, both of Bielefeld, all of (DE)

(73) Assignee: BASF Aktiengesellschaft, Ludwigshafen (DE)

( * ) Notice: Under 35 U.S.C. 154(b), the term of this patent shall be extended for 0 days.

(21) Appl. No.: 09/101,693

(22) PCT Filed: Jan. 22, 1997

(86) PCT No.: PCT/EP97/00277

§ 371 Date: Jul. 15, 1998

§ 102(e) Date: Jul. 15, 1998

(87) PCT Pub. No.: WO97/27227

PCT Pub. Date: Jul. 31, 1997

(30) Foreign Application Priority Data

Jan. 25, 1996 (DE) .............................. 196 02 543

(51) Int. Cl.⁷ ...................................................... C08F 4/52
(52) U.S. Cl. .................... 526/161; 526/127; 526/160; 526/352; 526/943; 502/152; 502/155; 502/103
(58) Field of Search .................... 526/127, 160, 526/161, 943, 352, 103; 502/152, 155

(56) References Cited

U.S. PATENT DOCUMENTS

| 4,794,096 | 12/1988 | Ewen .................... 502/117 |
| 5,371,260 | 12/1994 | Sangokoya .................... 556/176 |
| 5,391,793 | 2/1995 | Marks et al. .................... 556/179 |
| 5,527,929 | * 6/1996 | Timmers et al. .................... 556/7 |
| 5,554,795 | * 9/1996 | Frey et al. .................... 568/8 |

FOREIGN PATENT DOCUMENTS

| 284 708 | 10/1988 | (EP) . |
| 608 054 | 7/1994 | (EP) . |
| 621 279 | 10/1994 | (EP) . |
| 633 264 | 1/1995 | (EP) . |
| 91/09882 | 7/1991 | (WO) . |
| 92/12117 | 7/1992 | (WO) . |

OTHER PUBLICATIONS

Organ. 1994, 13, 4140–4142, Flores et al.
Jrl. Of Org. Chem., 423 (1992) 31–38, Wang et al.
Jrl. Of Org. Chem., 480 (1994) C18–C19, Jutzi et al.
Jrl. Of Org. Chem., 486 (1995) 287–289, Jutzi et al.

\* cited by examiner

Primary Examiner—David W. Wu
Assistant Examiner—Caixia Lu
(74) Attorney, Agent, or Firm—Keil & Weinkauf

(57) ABSTRACT

Polymers of $C_2$–$C_{10}$ alkenes are prepared in the presence of catalyst systems comprising as active constituents A) a metallocene complex of the general formula I

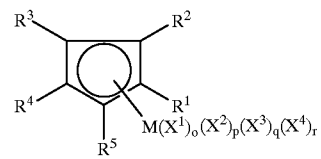

where the substituents and indices have the following meanings:

M is titanium, zirconium, hafnium, vanadium, niobium or tantalum, $R^1$ to $R^4$ are hydrogen, $C_1$–$C_{10}$-alkyl, 5- to 7-membered cycloalkyl which in turn can bear a $C_1$–$C_{10}$-alkyl as substituent, $C_6$–$C_{15}$-aryl or arylalkyl, where two adjacent radicals may also together be cyclic groups having from 4 to 15 carbon atoms, $Si(R^6)_3$,

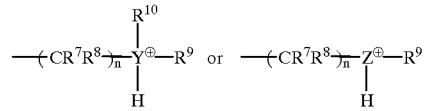

where
$R^6$ is $C_1$–$C_{10}$-alkyl, $C_6$–$C_{15}$-aryl or $C_3$–$C_{10}$-cycloalkyl,
$R^7$ and $R^8$ are hydrogen, $C_1$–$C_{10}$-alkyl, $C_6$–$C_{15}$-aryl or $C_3$–$C_{10}$-cycloalkyl,
$R^9$ and $R^{10}$ are $C_1$–$C_{10}$-alkyl, $C_6$–$C_{15}$-aryl or $C_3$–$C_{10}$-cycloalkyl,
Y is nitrogen, phosphorus, arsenic, antimony, or bismuth,
Z is oxygen, sulfur, selenium or tellurium,
n is an integer in the range from 0 to 10,

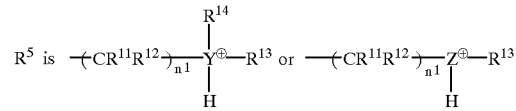

B) a compound forming metallocenium ions.

7 Claims, No Drawings

PROCESS FOR PREPARING POLYMERS OF $C_2$-$C_{10}$ ALKENES IN THE PRESENCE OF METALLOCENE COMPLEXES WITH CATIONICALLY FUNCTIONALIZED CYCLOPENTADIENYL LIGANDS

Preparation of polymers of $C_2$–$C_{10}$-alkenes in the presence of metallocene complexes having cationically functionalized cyclopentadienyl ligands The present invention relates to a process for preparing polymers of $C_2$–$C_{10}$-alkenes in the presence of catalyst systems.

The present invention further provides for the use of the polymers obtainable in this way for producing fibers, films or moldings as well as the fibers, films and moldings obtainable therefrom.

The metallocenes used for the polymerization of alkenes are generally very sensitive to air and moisture, which makes the use of these metallocenes difficult since they have to be handled under an inert gas atmosphere.

EP-A 608 054 describes catalyst systems for preparing polyolefins, in which the metallocene complexes are functionalized with Lewis bases. These complexes are very sensitive to air and moisture.

The same disadvantage is exhibited by the catalyst systems described in Organometallics 1994, 13, 4140–4142 for preparing polyethylene and polypropylene, these likewise comprising metallocene complexes functionalized with Lewis bases.

It is an object of the present invention to provide metallocene catalyst systems for polymerizing alkenes, which catalyst systems are insensitive to air and moisture and thus are simpler to handle.

We have found that this object is achieved by a process for preparing polymers of $C_2$–$C_{10}$-alkenes in the presence of catalyst systems comprising as active constituents A) a metallocene complex of the general formula I

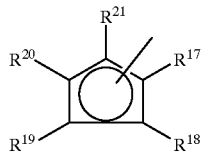

where the substituents and indices have the following meanings:
M is titanium, zirconium, hafnium, vanadium, niobium or tantalum,
$R^1$ to $R^4$ are hydrogen, $C_1$–$C_{10}$-alkyl, 5- to 7-membered cycloalkyl which in turn can bear a $C_1$–$C_{10}$-alkyl as substituent, $C_6$–$C_{15}$-aryl or arylalkyl, where two adjacent radicals may also together be cyclic groups having from 4 to 15 carbon atoms, $Si(R^6)_3$,

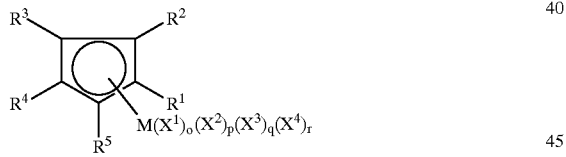

where
$R^6$ is $C_1$–$C_{10}$-alkyl, $C_6$–$C_{15}$-aryl or $C_3$–$C_{10}$-cycloalkyl,
$R^7$ and $R^8$ are hydrogen, $C_1$–$C_{10}$-alkyl, $C_6$–$C_{15}$-aryl or $C_3$–$C_{10}$-cycloalkyl, $R^9$ and $R^{10}$ are $C_1$–$C_{10}$-alkyl, $C_6$–$C_{15}$-aryl or $C_3$–$C_{10}$-cycloalkyl,
Y is nitrogen, phosphorus, arsenic, antimony, or bismuth,
Z is oxygen, sulfur, selenium or tellurium,
n is an integer in the range from 0 to 10,

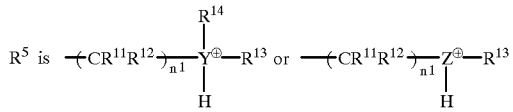

where
$R^{11}$ and $R^{12}$ are hydrogen, $C_1$–$C_{10}$-alkyl, $C_6$–$C_{15}$-aryl or $C_3$–$C_{10}$-cycloalkyl,
$R^{13}$ and $R^{14}$ are $C_1$–$C_{10}$-alkyl, $C_6$–$C_{15}$-aryl or $C_3$–$C_{10}$-cycloalkyl,
$n^1$ is an integer in the range from 0 to 10,
$X^1$ to $X^4$ are fluorine, chlorine, bromine, iodine, hydrogen, $C_1$–$C_{10}$-alkyl, $C_6$–$C_{15}$-aryl, alkylaryl having from 1 to 10 carbon atoms in the alkyl radical and from 6 to 20 carbon atoms in the aryl radical, —$OR^{15}$, —$NR^{15}R^{16}$ or

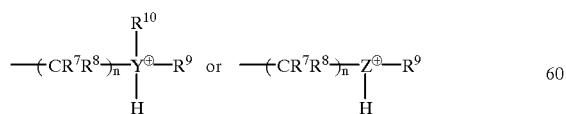

where
$R^{15}$ and $R^{16}$ are $C_1$–$C_{10}$-alkyl, $C_6$–$C_{15}$-aryl, alkylaryl, arylalkyl, fluoroalkyl or fluoroaryl, each having from 1 to 10 carbon atoms in the alkyl radical and from 6 to 20 carbon atoms in the aryl radical,
$R^{17}$ to $R^{21}$ are hydrogen, $C_1$–$C_{10}$-alkyl, 5- to 7-membered cycloalkyl which in turn can bear a $C_1$–$C_{10}$-alkyl as substituent, $C_6$–$C_{15}$-aryl or arylalkyl, where two adjacent radicals may also together be cyclic groups having from 4 to 15 carbon atoms, $Si(R^{22})_3$,

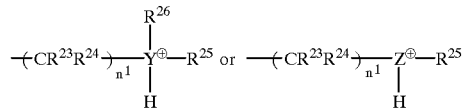

where
$R^{22}$ is $C_1$–$C_{10}$-alkyl, $C_6$–$C_{15}$-aryl or $C_3$–$C_{10}$-cycloalkyl,
$R^{23}$ and $R^{24}$ are hydrogen, $C_1$–$C_{10}$-alkyl, $C_6$–$C_{15}$-aryl or $C_3$–$C_{10}$-cycloalkyl,
$R^{25}$ and $R^{26}$ are $C_1$–$C_{10}$-alkyl, $C_6$–$C_{15}$-aryl or $C_3$–$C_{10}$-cycloalkyl,
$n^2$ is an integer in the range from 0 to 10 and
o, p, q, r are integers in the range from 0 to 4, where the sum o+p+q+r+1 corresponds to the valence of M and B) a compound forming metallocenium ions.

Furthermore, the present invention provides for the use of the polymers obtainable in this way for producing fibers, films or moldings and provides the fibers, films and moldings obtainable therefrom.

Among the metallocene complexes of the general formula I which are used in the process of the present invention, preference is given to those in which M is titanium, zirconium or hafnium, in particular titanium, $R^1$ to $R^4$ are hydrogen, $C_1$–$C_6$-alkyl, $C_6$–$C_{15}$-aryl or where two adjacent radicals may be cyclic groups having from 8 to 12 carbon atoms, in particular hydrogen, $R^5$ is 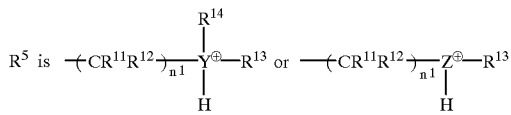

where $R^{11}$ and $R^{12}$ are hydrogen or $C_1$–$C_4$-alkyl, in particular hydrogen, methyl or ethyl, $R^{13}$ and $R^{14}$ are $C_1$–$C_6$-alkyl, in particular methyl, ethyl, n-propyl, iso-propyl, n-butyl or tert.-butyl or phenyl, $n^1$ is an integer in the range from 1 to 4, Y is nitrogen or phosphorus, Z is oxygen or sulfur, $X^1$ to $X^4$ are chlorine, $C_1$–$C_4$-alkyl or

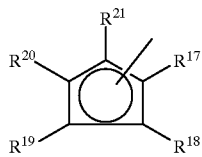

where $R^{17}$ to $R^{21}$ are hydrogen, $C_1$–$C_6$-alkyl, $C_6$–$C_{15}$-aryl or where two adjacent radicals may be cyclic groups having from 8 to 12 carbon atoms or

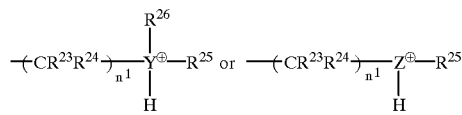

$R^{23}$ and $R^{24}$ are hydrogen or $C_1$–$C_4$-alkyl, in particular hydrogen, methyl or ethyl, $R^{25}$ and $R^{26}$ are $C_1$–$C_6$-alkyl, in particular methyl, ethyl, n-propyl, iso-propyl, n-butyl or tert.-butyl or phenyl and $n^2$ is an integer in the range from 1 to 4.

Particular preference is given to metallocene complexes of the general formula I in which $R^5$ is

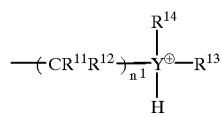

in particular

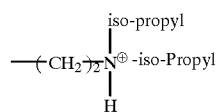

and $R^1$ to $R^4$ are hydrogen. It is also preferred, particularly when M is titanium, that $X^1$, $X^2$ and $X^3$ are chlorine and o is 1, p is 1, q is 1 and r is 0 or that $X^1$ and $X^2$ are chlorine and $X^3$ is

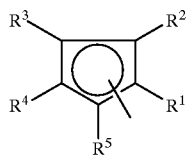

and o is 1, p is 1, q is 1 and r is 0, so that symmetrical complexes result.

Examples of particularly preferred metallocene complexes of the general formula I are:

trichloro-$\eta^5$-[2-(N,N-diisopropylammonium) ethylcyclopentadienyl]titanium(IV) chloride dichlorodi-{$\eta^5$-[2-(N,N-diisopropylammonium) ethylcyclopentadienyl]}titanium(IV) dichloride trichloro-$\eta^5$-[2-(N,N-diisopropylammonium) ethylcyclopentadienyl]zirconium(IV) chloride dichlorodi-{$\eta^5$-[2-(N,N-diisopropylammonium) ethylcyclopentadienyl]}zirconium(IV) dichloride trichloro-$\eta^5$-[2-(N,N-dimethylammonium) ethylcyclopentadienyl]titanium(IV) chloride dichlorodi-{$\eta^5$-[2-(N,N-dimethylammonium) ethylcyclopentadienyl]}titanium(IV) dichloride trichloro-$\eta^5$-[2-(N,N-dimethylammonium) ethylcyclopentadienyl]zirconium(IV) chloride dichlorodi-{$\eta^5$-[2-N,N-dimethylammonium) ethylcyclopentadienyl]}zirconium(IV) dichloride dichloro-$\eta^5$-[2-(N,N-diisopropylammonium) ethylcyclopentadienyl] (trimethylsilylcyclopentadienyl)titanium(IV) chloride dichloro-$\eta^5$-[2-(N,N-diisopropylammonium) ethylcyclopentadienyl] (trimethylsilylcyclopentadienyl)zirconium(IV) chloride dichloro-cyclopentadienyl-$\eta^5$-[2-(N,N-diisopropylammonium)ethylcyclopentadienyl]titanium(IV) chloride dichloro-cyclopentadienyl-$\eta^5$-[2-(N,N-diisopropylammonium)ethylcyclopentadienyl] zirconium(IV) chloride.

It is also possible to use mixtures of various metallocene complexes I.

The metallocene complexes I can be prepared by first preparing the cyclopentadienyl systems functionalized with the hetero atom by reacting cyclopentadienyllithium or cyclopentadienylsodium with a hetero atom-functionalized chloroalkane, as described in Journal of Organometallic Chemistry, 1992, 423, 31–38 and Journal of Organometallic Chemistry, 1994, 480, C18–C19. The hetero atom-functionalized cyclopentadienyl systems can subsequently be reacted with alkyllithium, for example n-butyllithium to give the corresponding hetero atom-functionalized cyclopentadienyllithium systems, as described, for example, in Journal of Organometallic Chemistry, 1995, 486, 287–289. These can now, preferably using MCl$_4$, be converted into the corresponding metallocene complexes as described in Journal of Organometallic Chemistry, 1995, 486, 287–289, but with the metallocene complexes not yet bearing cationically functionalized cyclopentadienylligands. The conversion to the metallocene complexes of the general formula I can be carried out by addition of acids of any type, as described in Journal of Organometallic Chemistry, 1995, 486, 287–289.

The addition of these acids gives a counterion to the metallocene complexes of the general formula I, this being derived from the acid added. These counterions can be, for example: halides, carboxylate anions, sulfates, phosphates, carbonates, nitrates, $PF_6^-$, $BF_4^-$ or $HPO_4^{2-}$. The type of counterion is not critical. Preference is given to halides, in particular chlorides.

Suitable compounds B) forming metallocenium ions are, in particular, strong, neutral Lewis acids, ionic compounds containing Lewis-acid cations, ionic compounds having Bronsted acids as cation and aluminoxane compounds.

As strong, neutral, Lewis acids, preference is given to compounds of the general Formula IV

   $M^1X^5X^6X^7$   IV where

M$^1$ is an element of main group III of the Periodic Table, in particular B, Al or Ga, preferably B, $X^5$, $X^6$ and $X^7$ are hydrogen, $C_1$–$C_{10}$-alkyl, $C_6$–$C_{15}$-aryl, alkylaryl, arylalkyl, haloalkyl or haloaryl, each having from 1 to 10 carbon atoms in the alkyl radical and from 6 to 20 carbon atoms in the aryl radical, or fluorine, chlorine, bromine or iodine, in particular haloaryl, preferably pentafluorophenyl.

Particular preference is given to compounds of the general formula IV, in which $X^5$, $X^6$ and $X^7$ are identical, preferably tris(pentafluorophenyl)borane.

Suitable ionic compounds containing Lewis-acid cations are compounds of the general formula V

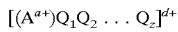   $[(A^{a+})Q_1Q_2 \ldots Q_z]^{d+}$   V where

A is an element of main groups I to VI or transition groups I to VIII of the Periodic Table, $Q_1$ to $Q_z$ are radicals bearing a single negative charge, for example $C_1$–$C_{28}$-alkyl, $C_6$–$C_{15}$-aryl, alkylaryl, arylalkyl, haloalkyl, haloaryl, each of which have from 6 to 20 carbon atoms in the aryl radical and from 1 to 28 carbon atoms in the alkyl radical, $C_1$–$C_{10}$-cycloalkyl which may be substituted by $C_1$–$C_{10}$-alkylgroups, halogen, $C_1$–$C_{28}$-alkoxy, $C_6$–$C_{15}$-aryloxy, silyl or mercaptyl groups, a is an integer from 1 to 6, z is an integer from 0 to 5, d corresponds to the difference a–z, but with d being greater than or equal to 1.

Particularly suitable are carbonium cations, oxonium cations and sulfonium cations and also cationic transition metal complexes. Particularly useful examples are the triphenylmethyl cation, the silver cation and the 1,1'-dimethylferrocenyl cation. They preferably have non-coordinating counter ions, in particular boron compounds as are also mentioned in WO 91/09882, preferably tetrakis(pentafluorophenyl)borate.

Ionic compounds having Brönsted acids as cations and preferably likewise non-coordinating counterions are mentioned in WO 91/09882, the preferred cation being N,N-dimethylanilinium.

Particularly suitable as compound B) forming metallocenium ions are open-chain or cyclic aluminoxane compounds of the general formula II or III

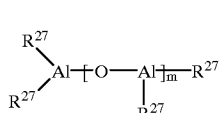

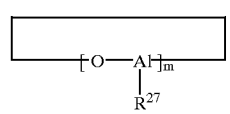

where $R^{27}$ is a $C_1$–$C_4$-alkyl group, preferably a methyl or ethyl group, and m is an integer from 5 to 30, preferably from 10 to 25.

These oligomeric aluminoxane compounds are usually prepared by reacting a solution of trialkylaluminum with water and is described, inter alia, in EP-A 284 708 and U.S. Pat. No. 4,794,096.

In general, the oligomeric aluminoxane compounds thus obtained are mixtures of chain molecules of various lengths, both linear and cyclic, so that m is to be regarded as a mean value. The aluminoxane compounds can also be in the form of a mixture with other metal alkyls, preferably aluminum alkyls.

Furthermore, it is also possible to use aryloxyaluminoxanes, as described in U.S. Pat. No. 5,391,793, aminoaluminoxanes as described in U.S. Pat. No. 5,371,260, aminoaluminoxane hydrochlorides, as described in EP-A 633 264, siloxyaluminoxanes, as described in EP-A 621 279 or mixtures thereof as component B).

It has been found to be advantageous to use the metallocene complexes and the oligomeric aluminoxane compound in amounts such that the atomic ratio between aluminum from the oligomeric aluminoxane compound and the transition metal from the metallocene complexes is in the range from 10:1 to $10^6$:1, in particular in the range from 10:1 to $10^4$:1.

Solvents used for these catalyst systems are usually aromatic hydrocarbons, preferably having from 6 to 20 carbon atoms, in particular xylenes and toluene and their mixtures.

The catalyst systems can also be used in supported form.

Support materials used are preferably finely divided supports which preferably have a particle diameter in the range from 1 to 300 µm, in particular from 30 to 70 µm. Suitable support materials are, for example, silica gels, preferably those of the formula $SiO_2 \cdot a\ Al_2O_3$, where a is a number in the range from 0 to 2, preferably from 0 to 0.5; these are thus aluminosilicates or silicon dioxide. Such products are commercially available, e.g. silica gel 332 from Grace. Further supports are, inter alia, finely divided polyolefins, for example finely divided polypropylene or magnesium chloride.

The process of the present invention can be carried out in the gas phase, in suspension, in solution and in liquid monomers. Suitable suspension media are, for example, aliphatic hydrocarbons. The process of the present invention is preferably carried out in solution, preferably in toluene as solvent.

It has here been found to be particularly advantageous for the metallocene complex of the general formula I (with its counterion) to be suspended in toluene at from −80 to 110° C. and for the compound forming metallocenium ions, likewise preferably as a toluene solution, to be added at a pressure of from 0.5 to 50 bar. The actual polymerization conditions are not critical per se; preference is given to temperatures in the range from −50 to 300° C., pressures in the range from 0.5 to 3000 bar and reaction times of from 0.1 to 24 hours. The polymerization can be stopped by addition of, for example, a methanolic/aqueous solution of HCl.

The mean molecular weight of the polymers formed can be controlled using the methods customary in polymerization technology, for example by feeding in regulators such as hydrogen.

Suitable $C_2$–$C_{10}$-alkenes for use in the polymerization are, in particular, ethylene, but also propylene or higher alk-1-enes such as but-1-ene, pent-1-ene and hex-1-ene. For the purposes of the present invention, polymers may be either homopolymers or copolymers.

The polymers prepared by the process of the present invention can be readily processed and are suitable for producing fibers, films and moldings.

The process of the present invention is particularly notable for the fact that the metallocene complexes used are insensitive to air and moisture and can therefore be handled readily.

EXAMPLES

Examples 1 to 3

Preparation of the Metallocene Complexes I

Example 1

Preparation of

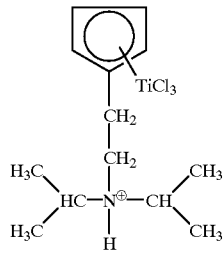

(I1)

A solution of 7.65 mmol of

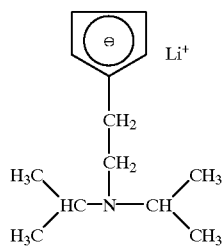

(I')

in 40 ml of ether (prepared from 1.48 g (7.65 mmol) of

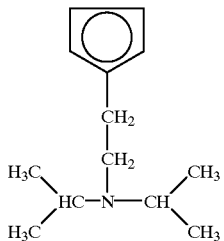

(I*)

and 4.78 ml (7.65 mmol) of a 1.6 molar n-butyllithium solution in diethyl ether) was added dropwise at −30° C. to a solution of 1.45 g (7.65 mmol) of $TiCl_4$ in 70 ml of toluene. The reaction mixture was subsequently allowed to warm up to room temperature over a period of 2 hours and was stirred for a further 14 hours. The solution was filtered and the solvent was taken off under reduced pressure. The product was obtained in the form of a deep red oil. Yield: 1.70 g (64%).

$^1$H-NMR (CDCl$_3$):δ=0.91 (d, $^3$J=6.6 Hz, 12H, CH—C$\underline{H}_3$), 2.69 (t, $^3$J=7.4 Hz, 2H, Cp—C$\underline{H}_2$), 2.88 (t, $^3$J=6.8 Hz, 2H, N—C$\underline{H}_2$), 2.99 (m, 2H, C$\underline{H}$—CH$_3$), 6.86, 6.89 (m, 4H, Cp—$\underline{H}$).

500 mg (1.44 mmol) of this product were admixed with 15 ml of HCl-saturated methanol solution and stirred for 30 minutes. After removing the solvent under reduced pressure, the residue was washed twice with 20 ml each time of pentane to give an orange-brown solid. Yield: 510 mg (1.34 mmol, 93%). Mp.: 130° C. (decomposition).

$^1$H-NMR (CD$_3$OD):δ=1.42, 1.44 (2d, $^3$J=4.8 Hz, 12H, CH—C$\underline{H}_3$), 3.24 (m, 2H, Cp—C$\underline{H}_2$), 3.47 (m, 2H, N—C$\underline{H}_2$), 3.80 (m, 2H, C$\underline{H}$—CH$_3$), 6.61, 6.67 (m, 4H, Cp—$\underline{H}$).

$^{13}$C-NMR (CD$_3$OD): δ=17.2, 18.7 (CH—$\underline{C}$H$_3$), 29.2 (Cp—$\underline{C}$H$_2$), 47.5 ($\underline{C}$H$_2$—N), 56.6 ($\underline{C}$H—CH$_3$), 120.4, 121.2 (ring—$\underline{C}$H═), 133.7 (ring═$\underline{C}$—CH$_2$—CH$_2$).

Example 2

Preparation of

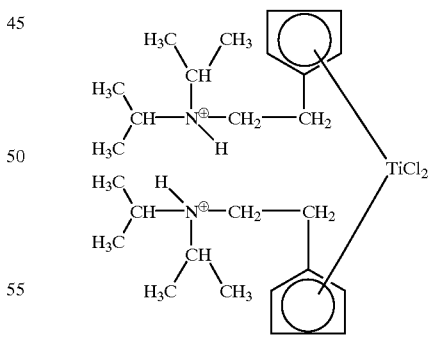

(I2)

A solution of 20.2 mmol of I' in 80 ml of ether (prepared from 3.90 g (20.2 mmol) of I* and 12.60 ml (20.2 mmol) of a 1.6 molar n-butyllithium solution in diethyl ether) was added dropwise at −40° C. to a solution of 1.92 g (10.1 mmol) of $TiCl_4$ in 80 ml of toluene. The reaction mixture was subsequently allowed to warm up to room temperature over a period of 6 hours and was stirred for a further 10 hours. The solution was decanted from the precipitated solid and the residue was washed with 2×30 ml of cold (−40° C.)

pentane. This gave a deep red solid. Recrystallization from toluene gave red crystals. Yield: 2.50 g (49%). Mp.: 156° C. (decomposition).

$^1$H-NMR (CDCl$_3$): δ=0.92 (d, $^3$J=6.5 Hz, 24H, CH—C$\underline{H}_3$), 2.62 (m, 4H, Cp—C$\underline{H}_2$), 2.69 (m, 4H, N—C$\underline{H}_2$), 2.99 (m, 4H, C$\underline{H}$—CH$_3$), 6.32–6.36 (m, 8H, Cp—$\underline{H}$). $^1$H—NMR (C$_6$D$_6$): δ=0.90 (d, $^3$J=6.6 Hz, 24H, CH—C$\underline{H}_3$), 2.60 (m, 4H, Cp—C$\underline{H}_2$), 2.93 (m, 8H, N—C$\underline{H}_2$, C$\underline{H}$—CH$_3$), 5.76 (t, $^3$J=2.6 Hz, 4H, Cp—$\underline{H}$), 6.13 (t, $^3$J=2.7 Hz, 4H, Cp—$\underline{H}$).

$^{13}$C-NMR (C$_6$D$_6$): δ=21.0 (CH—$\underline{C}$H$_3$), 33.1 (Cp—$\underline{C}$H$_2$), 45.6 ($\underline{C}$H$_2$—N), 48.2 ($\underline{C}$H—CH$_3$), 114.6, 122.9 (ring—$\underline{C}$H=), 136.7 (ring=$\underline{C}$—CH$_2$—CH$_2$).

MS (LSIMS) [m/e (rel. int. %)]: 503 (3) [M$^+$+1H], 468 (3) [M$^+$–2Cl], 114 (100) [i(C$_3$H$_7$)$_2$NCH$_2$CH$_2$$^+$], 65 (8) [C$_5$H$_5$$^+$].

CHN: C$_{26}$H$_{44}$Cl$_4$N$_2$Zr(503.43). Calc.: C, 62.03; H, 8.80; N, 5.56; Found: C, 61.92; H, 8.68; N, 5.43.

Cl-Analysis (Schöninger method) Calc.: 14.08; Found: 12.97.

550 mg (1.09 mmol) of this product were admixed with 15 ml of HCl-saturated methanol solution and stirred for 30 minutes. After removing the solvent under reduced pressure, a red-brown solid was obtained. Yield: 628 mg (quantitative). Mp.: 144° C. (decomposition).

$^1$H-NMR (CD$_3$OD): δ=1.39, 1.40 (2d, $^3$J=6.6 Hz, 24H, CH—C$\underline{H}$), 3.33 (m, 4H, Cp—C$\underline{H}_2$), 3.56 (m, 4H, N—C$\underline{H}_2$), 3.78 (m, 4H, C$\underline{H}$—CH$_3$), 6.44 (t, $^3$J=2.5 Hz, 4H, Cp—$\underline{H}$), 6.74 (t, $^3$J=2.7 Hz, 4H, Cp—$\underline{H}$).

$^{13}$C-NMR (CD$_3$OD): δ=17.2, 18.8 (CH—$\underline{C}$H$_3$), 29.2 (Cp—$\underline{C}$H$_2$), 47.3 ($\underline{C}$H$_2$—N), 56.5 ($\underline{C}$H—CH$_3$), 115.8, 125.1 (ring—$\underline{C}$H=), 132.6 (ring—$\underline{C}$H=), 132.6 (ring=$\underline{C}$—CH$_2$—CH$_2$).

CHN: C$_{26}$H$_{46}$Cl$_4$N$_2$Ti (576.35); Calc.: C, 54.18; H, 8.04; N, 4.86; Found: C, 53.89; H, 8.30; N, 4.72.

Cl-Analysis (Schöninger method) Calc. :24.60; Found: 26.33.

Example 3

Preparation of

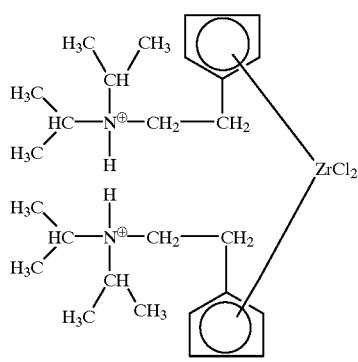

(I3)

A solution of 20.20 mmol of I' in 80 ml of ether (prepared from 3.90 g (20.20 mmol) of I* and 12.60 ml (20.20 mmol) of a 1.6 molar n-butyllithium-solution in diethyl ether) was added dropwise at –40° C. to a suspension of 2.35 g (10.10 mmol) of ZrCl$_4$ in 80 ml of toluene. The reaction mixture was subsequently allowed to warm up to room temperature over a period of 4 hours and was stirred for a further 24 hours. The solution was decanted from the precipitated solid and the residue was washed with 2×50 ml of cold (–40° C.) pentane. This gave a colourless solid. Recrystallization from toluene gave colourless crystals. Yield: 3.15 g (57%). Mp.: 124° C. (decomposition).

$^1$H-NMR (C$_6$D$_6$): δ=0.90 (d, $^3$J=6.6 Hz, 24H, CH—CH$_3$), 2.57 (t, $^3$J=6.5 Hz, 4H, Cp—C$\underline{H}_2$), 2.82 (m, 4H, N—C$\underline{H}_2$), 2.90 (m, 4H, C$\underline{H}$—CH$_3$), 5.77 (t, $^3$J=2.7 Hz, 4H, Cp—$\underline{H}$), 6.02 (t, $^3$J=2.7 Hz, 4H, Cp—$\underline{H}$).

$^{13}$C-NMR (C$_6$D$_6$): δ=21.1 (CH—$\underline{C}$H$_3$), 33.0 (Cp. $\underline{C}$H$_2$), 47.0 ($\underline{C}$H$_2$—N), 48.6 ($\underline{C}$H—CH$_3$), 109.1, 113.2, 113.5, 117.1 (ring—$\underline{C}$H=), 130.3 (ring=$\underline{C}$—CH$_2$—CH$_2$).

MS (LSIMS) [m/e (rel. int. %)]: 544 (2) [M$^+$], 114 (100) [i-(C$_3$H$_7$)$_2$NCH$_2$CH$_2$$^+$], 65 (2) [C$_5$H$_5$$^+$].

CHN: C$_{26}$H$_{44}$N$_2$Cl$_2$Zr (546.78); Calc.: C, 57.11; H, 8.11; N, 5.12; Found: C, 56.33; H 8.08; N 5.00.

Cl-Analysis (Schöninger method) Calc.: 12.96; Found: 13.57.

530 mg (0.97 mmol) of this product were admixed with 20 ml HCl-saturated methanol solution and stirred for 30 min. After removal of the solvent under reduced pressure, a beige solid was obtained. Yield: 600 mg (quantitative). Mp.: 188° C. (decomposition).

$^1$H-NMR (CD$_3$OD): δ=1.39, 1.41 (2d, $^3$J=6.6 Hz, 24H, CH—C$\underline{H}_3$), 3.19 (m, 4H, Cp—C$\underline{H}_2$), 3.46 (m, 4H, N—C$\underline{H}_2$), 3.78 (m, 4H, C$\underline{H}$—CH$_3$), 6.45 (m, 4H, Cp—$\underline{H}$), 6.61 (m, 4H, Cp—$\underline{H}$).

$^{13}$C-NMR (CD$_3$OD): δ=17.3, 18.9 (CH—$\underline{C}$H$_3$), 28.8 (Cp—$\underline{C}$H$_2$), 48.0 ($\underline{C}$H$_2$—N), 56.6 ($\underline{C}$H—CH$_3$), 113.5, 119.7 (ring—$\underline{C}$H=), 129.2 (ring=$\underline{C}$—CH$_2$—CH$_2$).

CHN: C$_{26}$H$_{46}$N$_2$Cl$_4$Zr (619.70); Calc.: C, 50.39; H, 7.48N 4.52; Found: C, 49.52; H 7.25; N 4.36.

Cl-Analysis (Schöninger method) Calc.: 22.88; Found:24.10.

Examples 4 to 6

Preparation of Polyethylene (PE)

The metallocene complexes I1, I2 and I3 were each suspended in toluene at room temperature. Under an ethylene atmosphere (1 bar), methylaluminoxane (MAO) (10% strength in toluene) was then added dropwise in each case. After 5 min, the solution slowly became turbid and warmed up as a result of the formation of polyethylene. After a reaction time, the polymerization was stopped by addition of 400 ml of methanolic/aqueous HCl. The polyethylene was filtered off, washed with water and acetone and dried to constant weight.

The amounts of raw materials, the reaction times and the properties of the polyethylenes formed are summarized in the table below.

The η-value was determined in accordance with ISO 1628-3, the weight average molecular weight M$_w$ and the number average molecular weight M$_n$ were determined by gel permeation chromatography.

TABLE

| Example | Metallocene complex | Toluene [ml] | MAO | Reaction time [h] | Yield [g] | Productivity [gPE/mol × c(C$_2$H$_4$) xh] | $\eta$ [dl/g] | $M_w$ | $M_n$ | $M_w/M_n$ |
|---|---|---|---|---|---|---|---|---|---|---|
| 4 | 20 mg I1 (53 µmol) | 10 | 16 ml (26 mmol) | 2 | 3.40 | $3.23 \cdot 10^4$ | 0.64 | 14258 | 3178 | 4.5 |
| 5 | 23 mg I2 (40 µmol) | 5 | 12 ml (20 mmol) | 4 | 1.50 | $1.00 \cdot 10^4$ | 0.78 | 14621 | 3661 | 4.0 |
| 6 | 25 mg I3 (40 µmol) | 5 | 12 ml (20 mmol) | 4 | 0.55 | $0.40 \cdot 10^4$ | 3.48 | — | — | — |

We claim:

1. A process for preparing polymers of $C_2$–$C_{10}$ alkenes in the presence of catalyst systems comprising as active constituents A) a metallocene complex of the general formula I

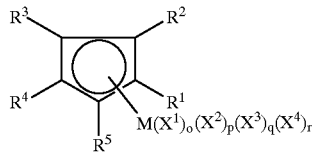

where the substituents and indices have the following meanings:

M is titanium, zirconium, hafnium, vanadium, niobium or tantalum, $R^1$ to $R^4$ are hydrogen, $C_1$–$C_{10}$-alkyl, 5- to 7-membered cycloalkyl which in turn can bear a $C_1$–$C_{10}$-alkyl as substituent, $C_6$–$C_{15}$-aryl or arylalkyl, where two adjacent radicals may also together be cyclic groups having from 4 to 15 carbon atoms, $Si(R^6)_3$,

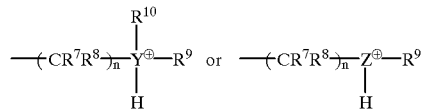

where $R^6$ is $C_1$–$C_{10}$-alkyl, $C_6$–$C_{15}$-aryl or $C_3$–$C_{10}$-cycloalkyl, $R^7$ and $R^8$ are hydrogen, $C_1$–$C_{10}$-alkyl, $C_6$–$C_{15}$-aryl or $C_3$–$C_{10}$-cycloalkyl, $R^9$ and $R^{10}$ are $C_1$–$C_{10}$-alkyl, $C_6$–$C_{15}$-aryl or $C_3$–$C_{10}$-cycloalkyl, Y is nitrogen, phosphorus, arsenic, antimony, or bismuth, Z is oxygen, sulfur, selenium or tellurium, n is an integer in the range from 0 to 10, $R^5$ is 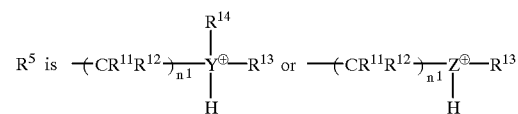

where $R^{11}$ and $R^{12}$ are hydrogen, $C_1$–$C_{10}$-alkyl, $C_6$–$C_{15}$-aryl or $C_3$–$C_{10}$-cycloalkyl, $R^{13}$ and $R^{14}$ are $C_1$–$C_{10}$-alkyl, $C_6$–$C_{15}$-aryl or $C_3$–$C_{10}$-cycloalkyl, $n^1$ is an integer in the range from 0 to 10, $X^1$ to $X^4$ are fluorine, chlorine, bromine, iodine, hydrogen, $C_1$–$C_{10}$-alkyl, $C_6$–$C_{15}$-aryl, alkylaryl having from 1 to 10 carbon atoms in the alkyl radical and from 6 to 20 carbon atoms in the aryl radical, —$OR^{15}$, —$NR^{15}R^{16}$ or

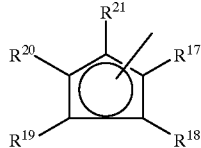

where $R^{15}$ and $R^{16}$ are $C_1$–$C_{10}$-alkyl, $C_6$–$C_{15}$-aryl, alkylaryl, arylalkyl, fluoroalkyl or fluoroaryl, each having from 1 to 10 carbon atoms in the alkyl radical and from 6 to 20 carbon atoms in the aryl radical, $R^{17}$ to $R^{21}$ are hydrogen, $C_1$–$C_{10}$-alkyl, 5- to 7-membered cycloalkyl which in turn can bear a $C_1$–$C_{10}$-alkyl as substituent, $C_6$–$C_{15}$-aryl or arylalkyl, where two adjacent radicals may also together be cyclic groups having from 4 to 15 carbon atoms, $Si(R^{22})_3$,

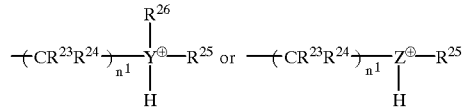

where $R^{22}$ is $C_1$–$C_{10}$-alkyl, $C_6$–$C_{15}$-aryl or $C_3$–$C_{10}$-cycloalkyl, $R^{23}$ and $R^{24}$ are hydrogen, $C_1$–$C_{10}$-alkyl, $C_6$–$C_{15}$-aryl or $C_3$–$C_{10}$-cycloalkyl, $R^{25}$ and $R^{26}$ are $C_1$–$C_{10}$-alkyl, $C_6$–$C_{15}$-aryl or $C_3$–$C_{10}$-cycloalkyl, $n^2$ is an integer in the range from 0 to 10 and o, p, q, r are integers in the range from 0 to 4, where the sum o+p+g+r+1 corresponds to the valence of M and B) a compound forming metallocenium ions.

2. A process as claimed in claim 1, wherein M in the general formula I is titanium, zirconium or hafnium.

3. A process as claimed in claim 1, wherein $R^5$ in the general formula I is

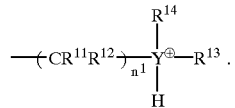

4. A process as claimed in claim 1, wherein $R^5$ in the general formula I is

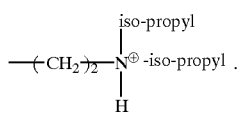

5. A process as claimed in claim 1, wherein $R^1$ to $R^4$ in the general formula I are hydrogen.

6. A process as claimed in claim 1, wherein the compound B) forming metallocenium ions which is fused is an open-chain or cyclic aluminoxane compound of the general formula II or III

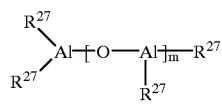
II

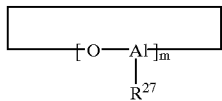
III where $R^{27}$ is a $C_1$–$C_4$-alkyl group and m is an integer from 5 to 30.

7. A process as claimed in claim 1, wherein the $C_2$–$C_{10}$-alkene used is ethylene.

* * * * *

UNITED STATES PATENT AND TRADEMARK OFFICE
CERTIFICATE OF CORRECTION

PATENT NO.: 6,180,737

DATED: January 30, 2001

INVENTOR(S): KRISTEN et al.

It is certified that error appears in the above-identified patent and that said Letters Patent is hereby corrected as shown below:

Col. 12, claim 1, lines 38-42, the formula shown should read as follows:

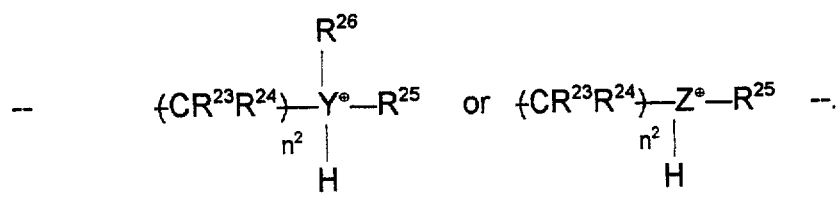

Signed and Sealed this

Twenty-ninth Day of May, 2001

Attest:

NICHOLAS P. GODICI

*Attesting Officer*     *Acting Director of the United States Patent and Trademark Office*